United States Patent [19]
Nakahara

[11] Patent Number: 5,907,636
[45] Date of Patent: May 25, 1999

[54] IMAGE SIGNAL DECODER

[75] Inventor: Masanao Nakahara, Kanagawa, Japan

[73] Assignee: NEC Corporation, Tokyo, Japan

[21] Appl. No.: 08/755,451

[22] Filed: Nov. 22, 1996

[30] Foreign Application Priority Data

Nov. 24, 1995 [JP] Japan ................................ 7-305337

[51] Int. Cl.$^6$ ........................................... G06K 9/36
[52] U.S. Cl. ........................................... 382/233
[58] Field of Search .................... 382/245, 246,
382/250, 248, 251, 233; 364/715.01, 725, 734

[56] References Cited

U.S. PATENT DOCUMENTS

| | | | |
|---|---|---|---|
| 5,046,121 | 9/1991 | Yonekawa et al. | 382/250 |
| 5,495,538 | 2/1996 | Fan | 382/250 |
| 5,625,714 | 4/1997 | Fukuda | 382/233 |

FOREIGN PATENT DOCUMENTS

5-316356  11/1993  Japan .

*Primary Examiner*—Jon Chang
*Assistant Examiner*—Samir Ahmed
*Attorney, Agent, or Firm*—Scully, Scott, Murphy & Presser

[57] ABSTRACT

An image signal decoder including a DC component correction processing section which inputs inverse transformed DC data X as direct current components of IDCT signals and produces DC component correction data Yn for correcting the inverse transformed DC data X of a target block in process using stored DC components RD corresponding to adjacent blocks of a target block image, resulting in reducing block distortion noises of a decoded image of compressed codes to improve image quality on visual evaluation and to make a large capacity image memory for storing the decoded image disused.

4 Claims, 6 Drawing Sheets

IMAGE SIGNAL DECODER

BACKGROUND OF THE INVENTION

The present invention relates to an image signal decoder for decoding compressed image coded data using the discrete cosine transform (DCT) such as MPEG (moving motion picture coding experts group) system.

DESCRIPTION OF THE RELATED ART

Halftone image signals of a TV motion picture or the like require enormous amounts of data. When such image signals are transmitted effectively or are stored in a recording medium such as a magnetic tape, a magnetic disc, an optical disc or the like, the image signals are often compressed in order to reduce the transmission time or to reduce the necessary storage capacity and, when receiving or reproducing, the compressed image signals are expanded again.

A compression-expansion system of such image signals is also called an image signal coding-decoding system, and trial of its international standardization has been carried out. One known standard MPEG has been proposed by the experts group (ISO/IEC, JTC1/SC2/WG8) of the ISO (International Standard Organization) and the CCITT (Comite Consultatif Internationale Telegraphique et Telephonique-International Consultative Committee for Telephone and Telegraph) (the first document). The MPEG standard defined in the recommendation ISO/IEC-11172-2 (1993) specifies the image signal coding-decoding system to be used for a recording into a storage medium, and the like.

Figure 1A:
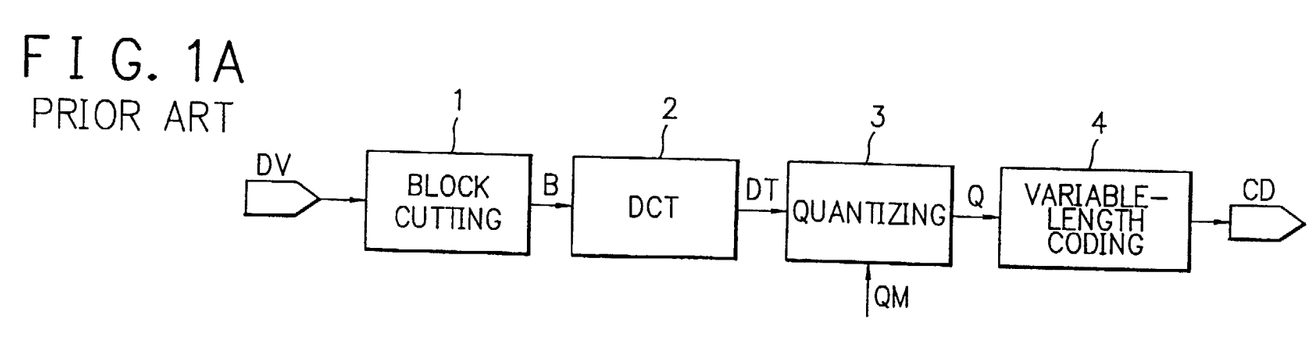
FIGS. 1A and 1B are block diagrams showing a conventional general image signal coder and a conventional image signal decoder, respectively.

FIG. 1A shows a conventional image signal coder according to the general MPEG standard (later "MPEG system").

In FIG. 1A, the image signal coder comprises a block cutting section 1 for cutting a block B including pixels of the product of predetermined numbers of pixels aligned in the horizontal and vertical directions out of input digital image data DV, a DCT (discrete cosine transform) section 2 for carrying out a discrete cosine transform of input image data per each block to output the transformed data DT, a quantizing section 3 for quantizing the transformed data DT using a quantization matrix QM to output a quantized data Q, and a variable-length coding section 4 for coding the quantized data Q to output variable-length compressed codes CD.

Figure 1B:
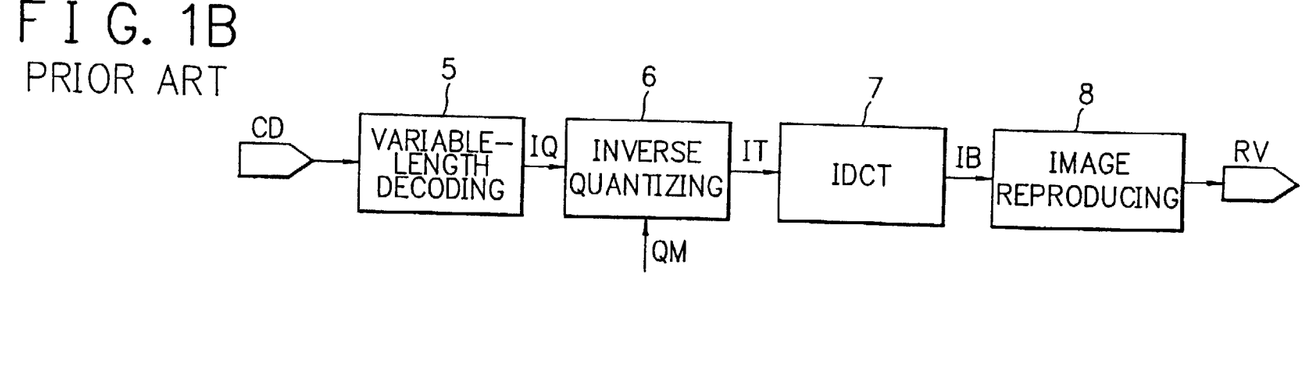

FIG. 1B shows a first conventional image signal decoder having a general construction of the MPEG system. In FIG. 1B, the image signal decoder comprises a variable-length decoding section 5 for conducting a variable-length decoding of the input compressed codes CD to output decoded quantization data IQ, an inverse quantizing section 6 for inversely quantizing the decoded quantization data IQ using the quantization matrix QM to output inverse transformed data IT, an IDCT (inverse discrete cosine transform) section 7 for carrying out an inverse discrete cosine transform of the inverse transformed data IT to output reproduced block data IB, and an image reproducing section 8 for reproducing an image again from the reproduced block data IB to output decoded image signals RV.

The operation of the conventional image signal coder shown in FIG. 1A and the first conventional image signal decoder shown in FIG. 1B will be described. The MPEG system further includes two kinds of systems such as MPEG1 and MPEG2. The image data DV has a size of 352×240 pixels in the case of the MPEG1 and of 704×480 pixels in the case of the MPEG2.

First, in the image signal coder, the block cutting section 1 divides the input digital image data DV into blocks B having a predetermined pixels, for example, in this example, 8×8 pixels in the horizontal and vertical directions to supply the obtained blocks B to the DCT section 2. The DCT section 2 implements a kind of orthogonal transformation, i.e., a two-dimensional DCT processing every unit of the block B. The DCT processing is a transformation to resolve the time series image signals into some waveforms (bases) having different frequency components, and the DCT section 2 produces the transformed data DT composed of factors (waveforms) representing frequency energy components made of 8×8 DC (direct current) and AC (alternating current) components corresponding to the number of the component pixels of each block B.

Figure 2A:
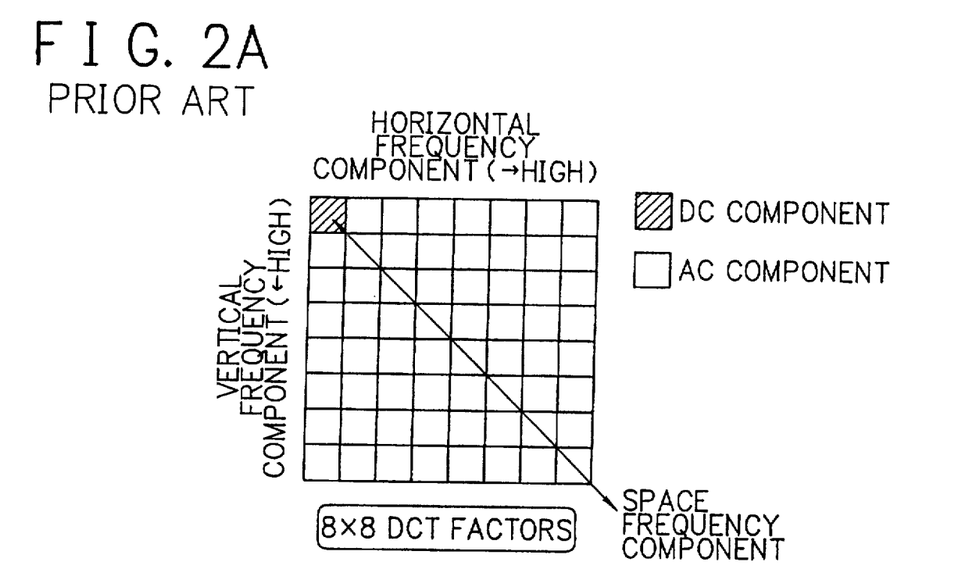
FIGS. 2A and 2B are schematic diagrams, the former showing transformed data DT as DCT factors in the form of a space frequency table prepared by a two-dimensional DCT processing and the latter showing a quantized matrix QM in the conventional image signal coder.

FIG. 2A shows transformed data DT as DCT factors in the form of a space frequency table, prepared by a two-dimensional DCT processing. As shown in FIG. 2A, as it moves from the upper left to the lower right, the frequency component increases. The waveform W11 in the left uppermost position is a DC component with the lowermost frequency among the whole 8×8 components and the waveforms of the others are all AC components.

Figure 2B:
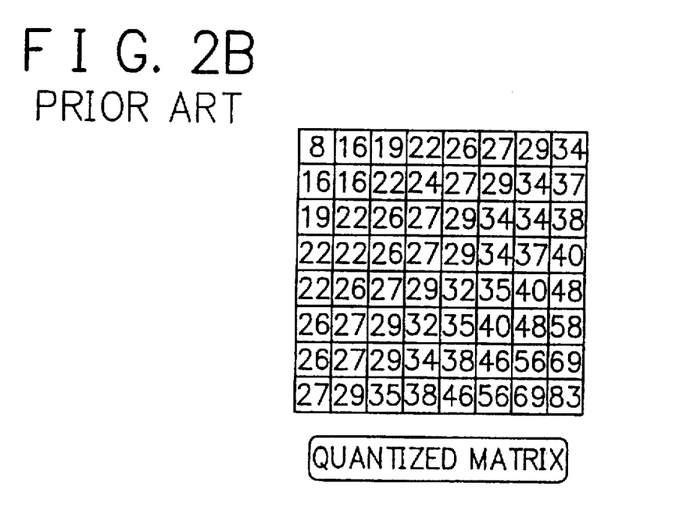

The quantizing section 3 quantizes the transformed data DT composed of the DC and AC components by dividing by the quantization matrix QM to prepare the quantized data Q. As shown in FIG. 2B showing a quantized matrix QM, the factors corresponding to lower frequency components are small and the factors become large as their frequencies increase.

The variable-length coding section 4 carries out a kind of entropy coding such as a Huffman coding against the quantized data Q to produce the compressed codes CD. This coding is implemented by referring to a Huffman table including assigned codes having bit lengths corresponding to occurrence probability of the values of the quantized data Q. That is, a short bit length code is assigned to high frequency quantized data and a long bit length code to low frequency quantized data. As a result, the code length per each block can be reduced.

In this image signal coding, no particular compensation is performed from the DCT section 2 to the quantizing section 3.

Next, in the image signal decoder, the opposite procedure to the image signal coding is carried out. First, the variable-length decoding section 5 executes a variable-length decoding of the compressed codes CD using a Huffman table to prepare the decoded quantization data IQ. The inverse quantizing section 6 inversely quantizes the decoded quantization data IQ to output the inverse transformed data IT corresponding to the original transformed data DT. The IDCT section 7 carries out an inverse discrete cosine transform (IDCT) of the inverse transformed data IT to output the reproduced block data IB as the image data of the block units. The image reproducing section 8 arranges the reproduced block data IB for reproducing the image to output the decoded image signals RV.

As described above, in the image signal coding, when the image is compressed, the input image data are transformed into the transformed data DT composed of the frequency components including the DC and AC components in the DCT section 2. The transformed data DT include many low frequency components because of high correlation of the input images DV. When the quantizing is carried out against the transformed data DT, a quantization error occurs due to the quantization factors.

Referring to FIG. 2B showing the quantized matrix, in the coding system using the DCT of this kind, in general, the quantized factors corresponding to the high frequency components of the DCT components have large values, and the quantized factors corresponding to the low frequency components of the DC factors and their adjacent AC factors have small values. Hence, the values corresponding to the low frequency components of the quantized data turn out large while the values of the high frequencies often become near zero. That is, the rate of the low frequency components increases in the values after the quantization, and, since the DC components are the lowest frequency components, the DC components occupies the largest rate in the low frequency components. Considering this fact every block unit, in the case of which there is a large difference between the DC components of one block and of its adjacent block, the difference is further enlarged after the decoding, resulting in occurring a block distortion in the decoded image.

Figure 3A:
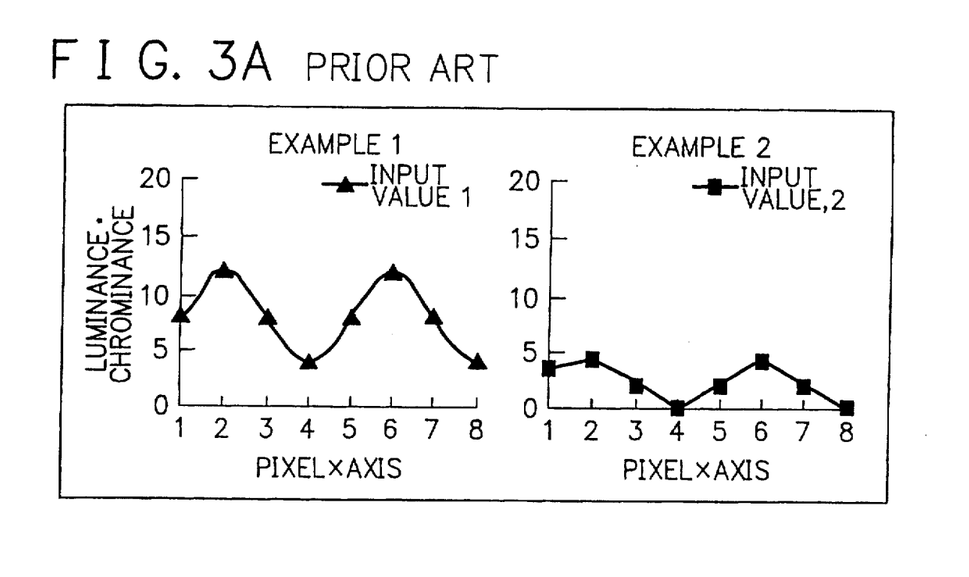
FIGS. 3A and 3B are graphical representations showing pixels of adjacent blocks in a one-dimensional typical and graphical manner and transformed data DT prepared by a DCT processing using the pixels of these blocks.
Figure 3B:
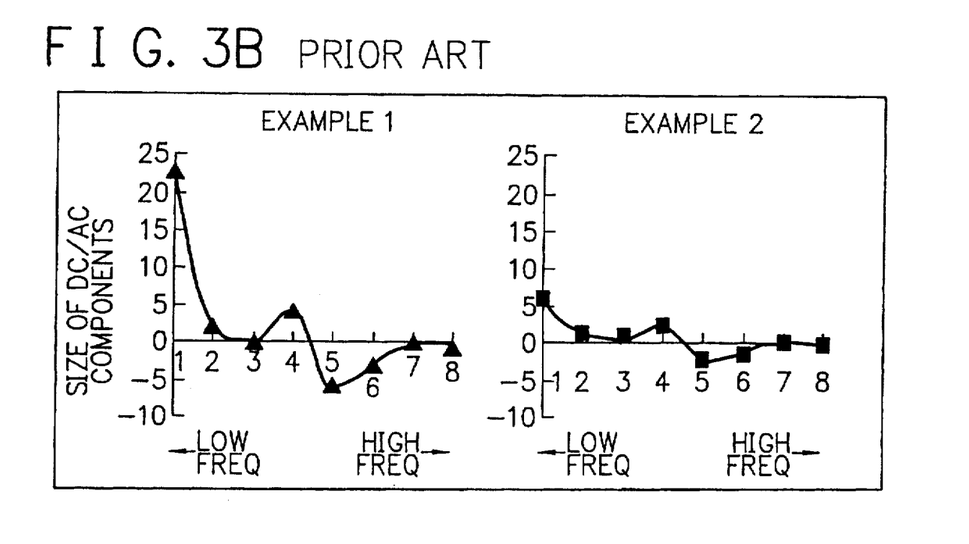

FIGS. 3A and 3B show pixels of adjacent blocks, plotted in a one-dimensional typical and graphical manner, and transformed data DT prepared by a DCT processing using these pixels of the blocks. As shown in FIG. 3B, in the transformed data, the DC components are largest and their occupying rate in the whole is also largest. In the quantization processing of the transformed data, many high frequency components are omitted as quantization errors, as apparent from the quantized matrix shown in FIG. 2B.

However, in the conventional image signal decoder shown in FIG. 1B, no compensation of the DC components is conducted, and noises called block distortion occur in the decoded image to cause image quality degradation.

In order to remove such block distortion, a second conventional image signal decoder capable of carrying out an image correction has been developed, as disclosed in Japanese Patent Application Laid-Open Publication No. 5-316356 (the second document). In this image signal decoder, a difference between the DC component of each block of the decoded quantization data after the variable-length decoding and the DC component of the adjacent block positioned in its previous or upper position in the horizontal or vertical direction is calculated. When the obtained difference is smaller than a predetermined value, in order to correct the image, a smoothing operation is applied to the pixels of the adjacent block to which the inverse quantizing and the IDCT have been carried out.

Figure 4:
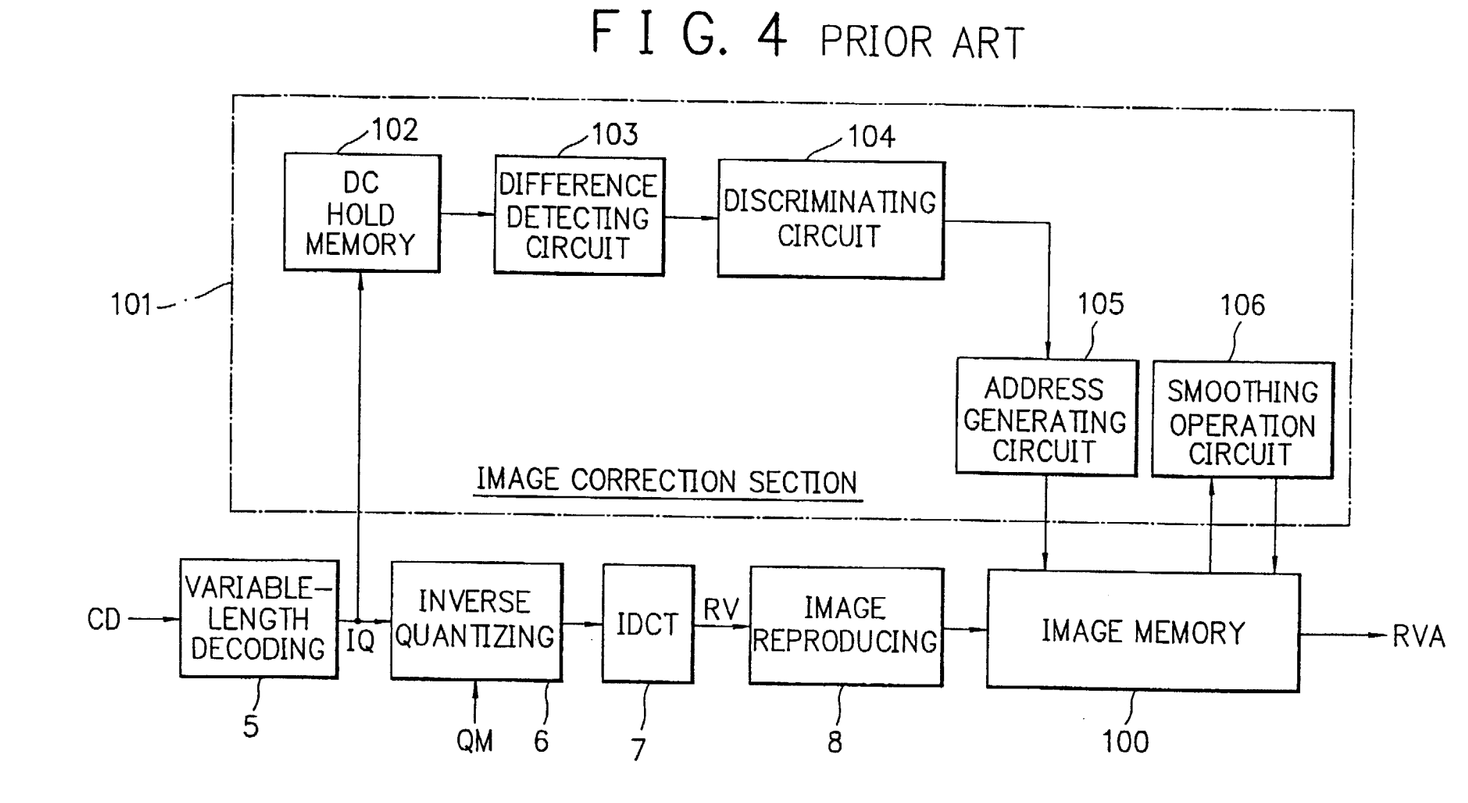
FIG. 4 is a block diagram of another conventional image signal decoder.

FIG. 4 shows one example of the second conventional image signal decoder, wherein like reference characters or numerals designate like or corresponding parts to those of the first conventional image signal decoder shown in FIG. 1B and thus the repeated description thereof can be omitted for brevity. The difference of the second image signal decoder from the first image signal decoder is the provision with an image memory 100 for storing the decoded image signals RV output from the image reproducing section 8 per block unit to output corrected image signals RVA, and an image correction section 101 for correcting the block units of pixels stored in the image memory 100.

The image correction section 101 includes a hold memory 102 for holding the DC components of the whole blocks of the decoded quantization data IQ output from the variable-length decoding section 5, a difference detecting circuit 103 for detecting a difference between the DC components of each block and the DC components of its left or upper adjacent block, a discriminating circuit 104 for discriminating whether a smoothing operation is required or not to output a discrimination signal along with the addresses of the block concerned, an address generating circuit 105 for generating the addresses of the image memory 100 so as to execute the smoothing operation in response to the discrimination signal and the addresses supplied from the discriminating circuit 104, and a smoothing operation circuit 106 for performing the smoothing operation of the above addresses.

The operation of the second conventional image signal decoder shown in FIG. 4 will be described. In the image correction section 101, when the difference between the DC components of each block and the DC components of its left or upper adjacent block is smaller than a predetermined value, the block concerned and its adjacent block are considered as the blocks regarding the flat area that block distortion is liable to be conspicuous and an image density variation is small. After the inverse quantizing, the IDCT and the image reproducing, the smoothing operation is applied to the pixels of only the block concerned and its adjacent block of the decoded image signals RV. As a result, the visual degradation can be improved without causing the whole image to appear blurred.

As described above, in the second conventional image signal decoder, the correction is applied to the decoded image signals and the image memory for storing the decoded image per block unit is required. Its necessary memory capacity is 352×240 pixels×3 bytes=approximately 2 M bits in the case of the image of the MPEG1 system.

In the first conventional image signal decoder, as described above, when the input image is compressed in coding, the many high frequency components are eliminated by the DCT, and the noises called the block distortion occur in the image after the decoding. The edges between the blocks become prominent and the picture quality is deteriorated.

The second conventional image signal decoder is developed so as to remove the problem of the first conventional image signal decoder. However, in the second decoder, the digital image is held after the decoding, and the image correction such as the smoothing operation between the certain blocks, and the like is applied to the held image. The large capacity memory is required for storing the above decoded image.

SUMMARY OF THE INVENTION

It is therefore an object of the present invention to provide an image signal decoder in view of the aforementioned defects of the prior art, which is capable of effectively reducing block distortion of a digital image after decoding to improve image quality on visual evaluation largely, and allowing an image memory with large capacity for storing a decoded image to be disused.

In accordance with one aspect of the present invention, there is provided an image signal decoder, comprising an inverse quantizing circuit for carrying out an inverse quantizing of coded image signals prepared by a discrete cosine transform of a block image composed of predetermined numbers of horizontal and vertical pixels and by quantizing the signals resulted by the discrete cosine transform, to output inverse discrete cosine signals corresponding to the signals resulted by the discrete cosine transform; an inverse discrete cosine transform circuit for carrying out an inverse discrete cosine transform of the inverse discrete cosine signals to prepare decoded block image data corresponding to the block image; and a DC component correction processing circuit which inputs inverse transformed DC components as direct current components of the inverse discrete cosine signals and produces DC component correction data for correcting target inverse transformed DC component corresponding to a target block image using left adjacent inverse transformed DC component corresponding to a left adjacent block image as at least a decoded block image adjacent to the left side of the target block image as the decoded block image in process at present.

In an image signal decoder, preferably, the DC component correction processing circuit includes a DC component memory for storing at least the left adjacent inverse transformed DC component to output at least the stored left adjacent DC component data; and an averaging circuit for averaging the inverse transformed DC component and at least the left adjacent stored DC component data to produce the DC component correction data.

In another image signal decoder, preferably, the DC component correction processing circuit includes a DC component memory for storing a plurality of adjacent inverse transformed DC components including at least the left adjacent inverse transformed DC component to output a plurality of stored adjacent DC component data; an averaging circuit for averaging the plurality of stored adjacent DC component data to produce averaged DC component data; a subtracter circuit for subtracting the averaged DC component data from the inverse transformed DC component to produce a different DC component; and a DC component correction data circuit which produces the DC component correction data from the difference DC component and the inverse transformed DC component in response to a supply of a DC component control signal variable in a predetermined numeric value range.

The DC component memory can store left, right, upper and lower adjacent inverse transformed DC components corresponding to left, right, upper and lower adjacent block images as decoded block images adjacent to the left, right, upper and lower sides of the target block image and outputs the stored left, right, upper and lower adjacent DC component data, and wherein the averaging circuit averages the inverse transformed DC component and the stored left, right, upper and lower adjacent DC component data to produce the DC component correction data.

The DC component correction data circuit preferably includes a multiplier circuit for multiplying the DC component control signal and the difference DC component to produce a multiplication difference DC component; and an adder circuit for adding the multiplication difference DC component and the inverse transformed DC component to produce the DC component correction data.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 5:
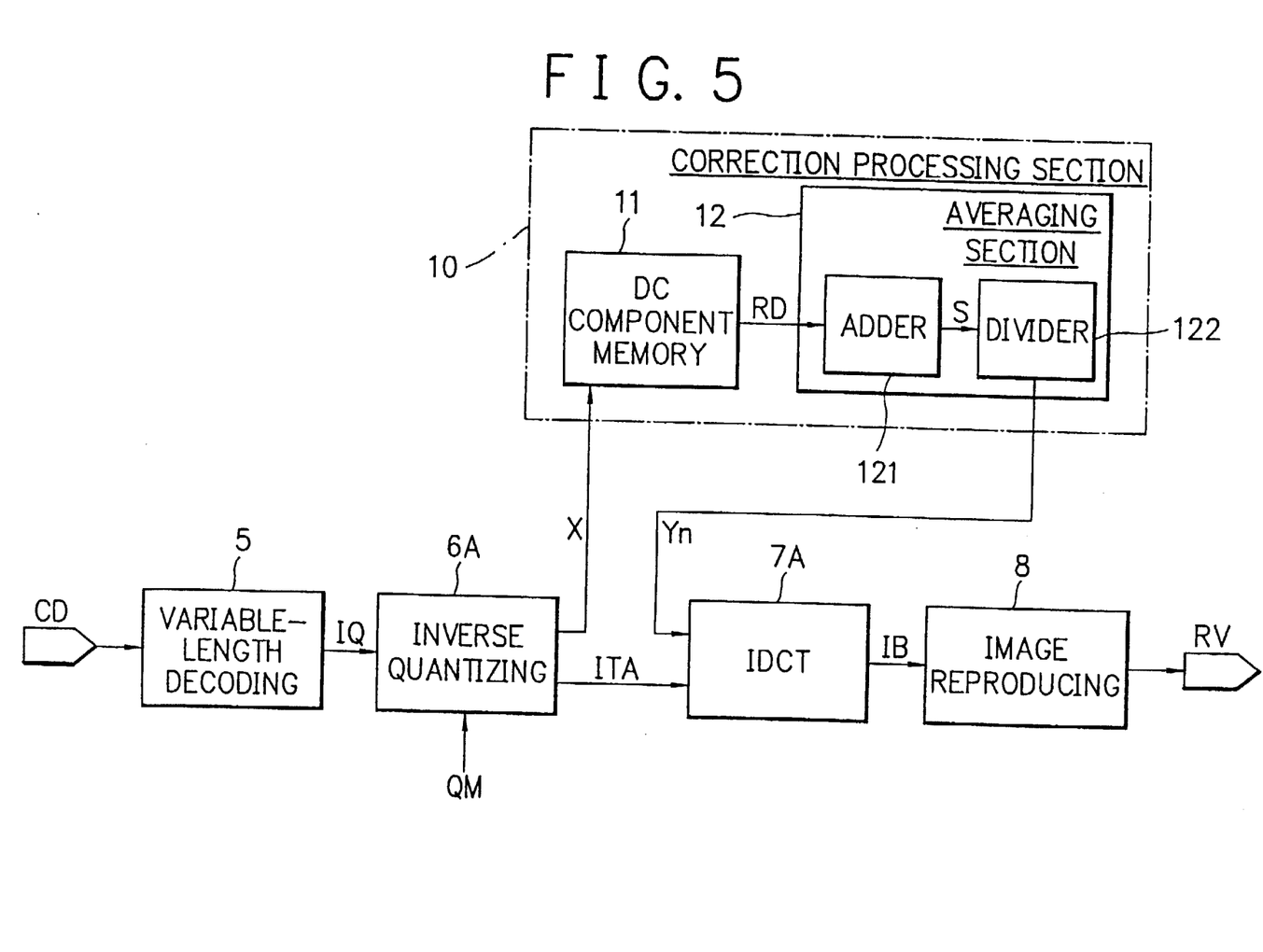
FIG. 5 is a block diagram of an image signal decoder according to the first embodiment of the present invention.

Referring now to the drawings, in FIG. 5, there is shown an image signal decoder according to a first embodiment of the present invention. In FIG. 5, like reference characters or numerals designate like or corresponding parts to those of the first conventional image signal decoder shown in FIG. 1B and thus the repeated description thereof can be omitted for brevity.

In the image signal decoder, as shown in FIG. 5, a variable-length decoding section 5 and an image reproducing section 8 have the same constructions and functions as those of the first conventional image signal decoder shown in FIG. 1B. An inverse quantizing section 6A inversely quantizes the decoded quantization data IQ to produce the inverse transformed data IT and outputs inverse transformed DC and AC data X and ITA as the DC and AC components of the inverse transformed data IT. An IDCT (inverse discrete cosine transform) section 7A inputs the inverse transformed AC data ITA and DC component correction data Yn and performs the IDCT processing of these data ITA and Yn to output reproduced block data IB. A correction processing section 10 averages the input inverse transformed DC data X corresponding to each block to produce the DC component correction data Yn of the block in process at present (target block).

The correction processing section 10 includes a DC component memory 11 and an averaging section 12. The DC component memory 11 stores the inverse transformed DC data X corresponding to the DC components of the adjacent blocks positioned in the same block position (past and future adjacent) blocks of upper, lower, left and right frames as well as past and future frames of the target data every block and outputs the stored DC component data RD. The averaging section 12 averages the stored DC component data RD to output the averaged DC component as the DC component correction data Yn.

The averaging section 12 includes an adder 121 and a divider 122. The adder 121 sums up the stored DC component data RD corresponding to n number of adjacent blocks to be averaged and the inverse transformed DC data X of the target block to output an addition result (value) S. The divider 122 divides the addition value S by the number (n+1) of the target block and the n number of adjacent blocks to output the obtained DC component correction data Yn.

The operation of the image signal decoder shown in FIG. 5 will be described. First, similar to the conventional decoder, the variable-length decoding section 5 executes the variable-length decoding of the input compressed codes CD to output the decoded quantization data IQ. The inverse quantizing section 6A inversely quantizes the decoded quantization data IQ to produce the inverse transformed data IT corresponding to the original transformed data DT and outputs only their DC components as the inverse transformed DC data X to the DC component memory 11 and the other AC components as the inverse transformed AC data ITA to the IDCT section 7A.

In the correction processing section 10, the DC component memory 11 successively stores the input inverse transformed DC data X and finally stores the inverse transformed DC data X of the target block including the upper, lower, left and right adjacent blocks and, if temporal block distortion is to be reduced in addition to spatial block distortion, further the past and future adjacent blocks. The averaging section 12 averages the DC component data RD stored in the DC component memory 11 and the inverse transformed DC data X of the target block to output the DC component correction data Yn. The IDCT section 7A inputs the inverse transformed AC data ITA and the DC component correction data Yn and performs the IDCT processing of these data ITA and Yn to output the reproduced block data IB. The image reproducing section 8 arranges the reproduced block data IB to reproduce the image and outputs the decoded image signals RV.

In this embodiment, as described above, the inverse transformed DC data as the DC components of the adjacent blocks of the target block are stored in the DC component memory 11, and the averaged value of the DC components stored in the DC component memory 11 and the DC components of the decoded target block is used as the DC component correction data Yn. Hence, the difference between the DC components of the adjacent blocks can be slight without requiring a large capacity image memory for storing the decoded image, and the main cause of the noises of the output image such as the block distortion can be reduced. Further, by varying a value of a DC component control signal z, the rate of the above described averaging can be changed and the noise removal matched to the image quality can be realized.

Next, in this embodiment, an actual processing will be described in detail. First, variables of formulas to be used are defined as follows.

The DC components of the adjacent blocks are defined as follows. That is, as regards the stored DC component data RD, the stored DC component corresponding to the upper adjacent block of the target block is U; similarly, the stored DC component of the left adjacent block is L; the stored DC component of the lower adjacent block is D; the stored DC component of the right adjacent block is R; the stored DC component of the past adjacent block is B; and the stored DC component of the future adjacent block is F. Further, the DC component of the target block is the inverse transformed DC data X, as described above, and the correction DC component is the DC component correction data Yn, as described above. Moreover, the DC component control signal z (hereinafter described) is selected from 0 to 1.

First, the simplest first processing method will be described. In this first processing method, only the stored DC component L of the left adjacent block, i.e., the preceding adjacent block is used (n=1). A value 1 of this stored DC component L and a value x of the inverse transformed DC data X are averaged to produce a value y1 of the DC component correction data Y1 as follows.

$$y1=(x+1)/2$$

Next, the second processing method for carrying out a more precise processing will be described. In this case, the stored DC components L, U, D and R corresponding to the upper, lower, left and right adjacent blocks are used (n=4). A value y4 of the DC component correction data Y4 is calculated by averaging the values 1, u, d and r of the stored DC components L, U, D and R and the value x of the inverse DC data X as follows.

$$y4=(1+u+d+r+x)/5$$

Moreover, besides the stored DC components L, U, D and R, the stored DC components B and F corresponding to the past and future adjacent blocks are used (n=6). Similarly, a value y6 of the DC component correction data Y6 is calculated as follows.

$$y6=(1+u+d+r+b+f+x)/7$$

Figure 6:
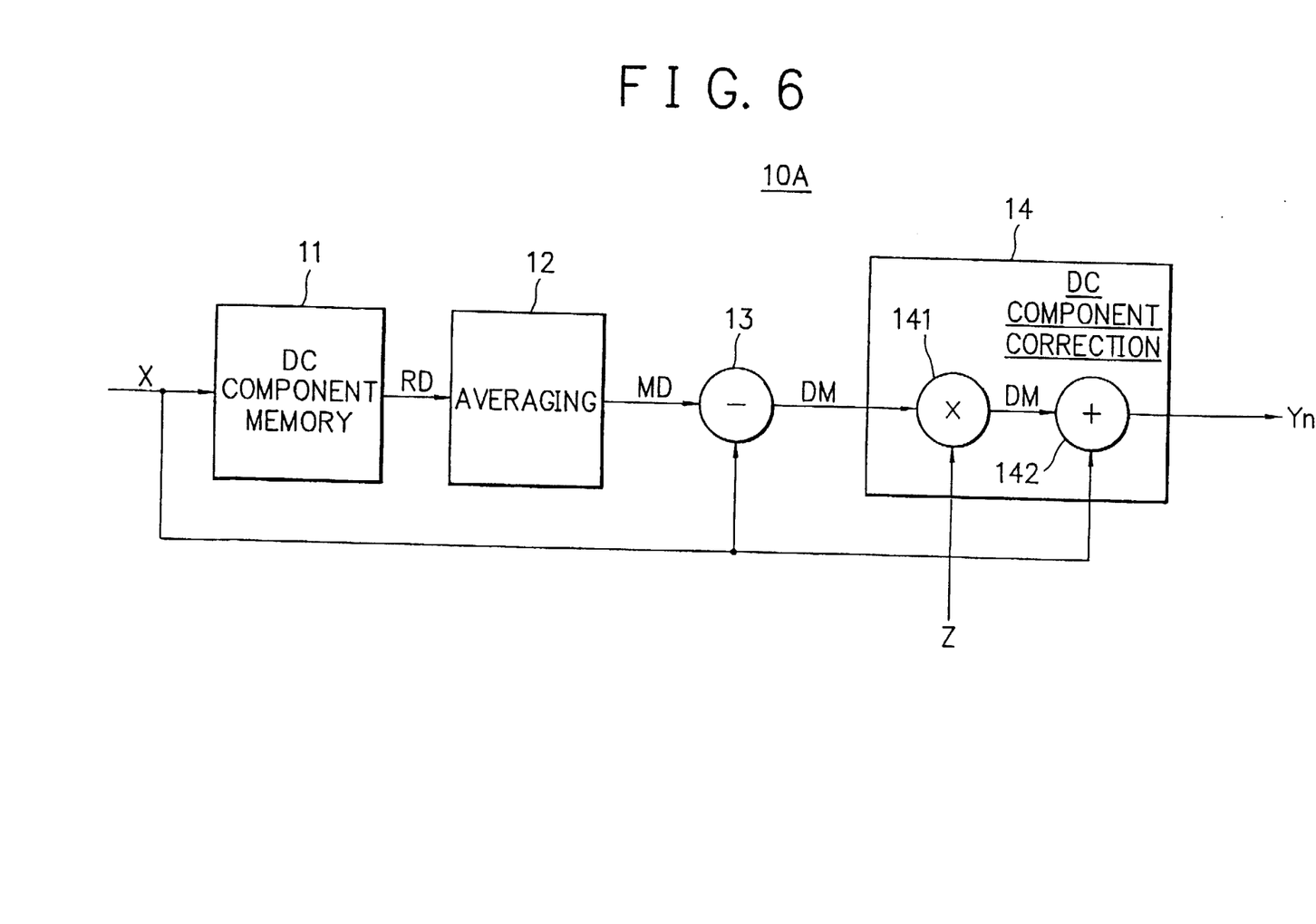
FIG. 6 is a block diagram of a correction processsing section of an image signal decoder according to the second embodiment of the present invention.

Next, FIG. 6 shows another correction processing section 10A of an image signal decoder according to the second embodiment of the present invention. The other parts 5, 6A, 7A and 8 are the same as those of the first embodiment shown in FIG. 5 and thus can be omitted from FIG. 6.

In this embodiment, the correction processing section 10A comprises a DC component memory 11, an averaging section 12, a subtracter 13 and a DC component correction section 14 including a multiplier 141 and an adder 142. Specifically, the subtracter 13 calculates a difference between an averaged DC component data MD output from the averaging section 12 and the inverse transformed DC data X to output difference data DM. The DC component correction section 14 corrects the inverse transformed DC data X by the difference data DM in response to a supply of the DC component control signal z to produce the DC component correction data Yn of the target block.

The operation of the above image signal decoder of the second embodiment will be described with reference to FIGS. 5 and 6. First, in the correction processing section 10A, the DC component memory 11 inputs the inverse transformed DC data X, and the averaging section 12 averages the input DC component data RD stored in the DC component memory 11 and the inverse transformed DC data X of the target block to output the averaged DC component data MD corresponding to the DC component correction data Yn in the first embodiment in the same manner as the first embodiment. Then, the subtracter 13 calculates the difference between the averaged DC component data MD output from the averaging section 12 and the inverse transformed DC data X to output the difference data DM to the DC component correction section 14. The DC component correction section 14 implements a predetermined correction operation against the difference data DM in response to the value of the DC component control signal z to prepare the DC component correction data Yn.

In the DC component correction section 14, the multiplier 141 multiplies the difference data DM and the DC component control signal z to output a multiplication data zDM, and the adder 142 sums up the multiplication data zDM and the inverse transformed DC data x to produce the DC component correction data Yn.

Next, in this embodiment, an actual processing will be described in detail.

First, similar to the first embodiment, the simplest third processing method will be described. In this case, only the stored DC component L of the left adjacent block is used (n=1). The subtracter 13 calculates a value m of the difference data DM between the value 1 of the stored DC component L and the value x of the inverse transformed DC data X as follows.

$$m=x-1$$

Next, in the DC component correction section 14, the multiplier 141 multiplies the value m of the difference data DM to the DC component control signal z to obtain a value zm of the multiplication data zDM. Then, the adder 142 adds the value x to the value zm to prepare a value y1 of the DC component correction data Y1. The value z is selected from a range of 0 to 1.

$$y1=x+zm=x+z(x-1)$$

Similarly, the fourth processing method for carrying out a high precise processing will be described. In this case, the stored DC components L, U, D, R, B and F corresponding to the upper, lower, left, right, past and future adjacent blocks are used (n=6). A value y6 of the DC component correction data Y6 is calculated using the values 1, u, d, r, b and f of the stored DC components L, U, D, R, B and F and the value x of the inverse DC data X as follows.

$$m = (1 + u + d + r + b + f)/6$$

$$y6 = x + z(x - m)$$

$$= x + z\{x - (1 + u + d + r + b + f)/6\}$$

Further, the fifth processing method for intending a higher precise processing will be described. In this case, the value of the DC component control signal z is set every value of the difference data DM. For example, in the case that the value m of the difference data MD is 0, z=0; in the case of m=1 to −1, z=0.2; in the case of m=4 to −4, z=0.3; and in the case that m is beyond the range 4 to −4, z=0.5.

Moreover, the sixth processing method for carrying out a highest precise processing will be described. In this case, in the fourth processing method, each of the stored DC components constituting the averaged DC component data MD is previously multiplied by a factor less than 1 so as to carry out a weighting. That is, the values 1, u, d, r, b and f of the stored DC components L, U, D, R, B and F are previously multiplied by factors h, i, j, k, o and p (but, h+i+j+k+o+p=1), respectively. Thereafter, the calculation is executed in the same manner as the fourth processing method. A value y6 of the DC component correction data Y6 is expressed as follows.

$$m = (1h + ui + dj + rk + bo + fp)/6$$

$$y6 = x + z\{x - (1h + ui + dj + rk + bo + fp)/6\}$$

As described above, according to the present invention, the image signal decoder includes the DC component correction processing circuit for producing the DC component correction data for correcting the DC components of the target block in process using the inverse transformed DC components of the adjacent blocks of the target block in response to the supply of the inverse transformed DC component, and the DC component correction processing circuit corrects the DC components of the target block in process. As a result, the block distortion of a digital image after decoding is effectively reduced to improve image quality on visual evaluation largely, and an image memory with large capacity for storing a decoded image can be made disused.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image signal decoder, comprising:

an inverse quantizing circuit for carrying out an inverse quantizing of coded image signals prepared by a discrete cosine transform of a block image composed of predetermined numbers of horizontal and vertical pixels and by quantizing the signals resulted by the discrete cosine transform, to output inverse discrete cosine signals corresponding to the signals resulted by the discrete cosine transform;

an inverse discrete cosine transform circuit for carrying out an inverse discrete cosine transformation of AC components of the inverse discrete cosine signals and DC component correction data to prepare decoded block image data corresponding to the block image; and a DC component correction processing circuit which inputs inverse transformed DC components of the inverse discrete cosine signals and produces the DC component correction data for correcting a target inverse transformed DC component corresponding to a target block image using a left adjacent inverse transformed DC component corresponding to a left adjacent block image as at least a decoded block image adjacent to the left side of the target block image as the decoded block image;

the DC component correction processing circuit including:

a DC component memory for storing a plurality of adjacent inverse transformed DC components including at least the left adjacent inverse transformed DC component to output a plurality of stored adjacent DC component data;

an averaging circuit for averaging the plurality of stored adjacent DC component data to produce averaged DC component data;

a subtractor circuit for subtracting the averaged DC component data from the inverse transformed DC component to produce a difference DC component; and a DC component correction data circuit which produces the DC component correction data from the difference DC component and the inverse transformed DC component in response to a supply of a DC component control signal variable in a predetermined numeric value range;

the DC component correction data circuit including:

a multiplier circuit for multiplying the DC component control signal and the difference DC component to produce a multiplication difference DC component; and an adder circuit for adding the multiplication difference DC component and the inverse transformed DC component to produce the DC component correction data.

2. An image signal decoder of claim 1, wherein the DC component correction processing circuit includes:

a DC component memory for storing at least the left adjacent inverse transformed DC component to output at least the stored left adjacent DC component data; and an averaging circuit for averaging the inverse transformed DC component and at least the left adjacent stored DC component data to produce the DC component correction data.

3. An image signal decoder of claim 2, wherein the DC component memory stores left, right, upper and lower adjacent inverse transformed DC components corresponding to left, right, upper and lower adjacent block images as decoded block images adjacent to the left, right, upper and lower sides of the target block image and outputs the stored left, right, upper and lower adjacent DC component data, and wherein the averaging circuit averages the inverse transformed DC component and the stored left, right, upper and lower adjacent DC component data to produce the DC component correction data.

4. An image signal decoder of claim 1, wherein the inverse quantizing circuit for carrying out an inverse quantizing of coded image signals, outputs a first and a second inverse discrete cosine signals corresponding to the signals resulted by the discrete cosine transform where a first inverse discrete cosine signal is an AC signal and the second inverse discrete cosine signal is a DC signal.

* * * * *